(12) United States Patent
Cook

(10) Patent No.: US 12,458,184 B1
(45) Date of Patent: Nov. 4, 2025

(54) PORTABLE TOILET SEAT

(71) Applicant: Trenton James Cook, Whitefish, MT (US)

(72) Inventor: Trenton James Cook, Whitefish, MT (US)

(*) Notice: Subject to any disclaimer, the term of this patent is extended or adjusted under 35 U.S.C. 154(b) by 60 days.

(21) Appl. No.: 18/217,642

(22) Filed: Jul. 3, 2023

(51) Int. Cl.
*A47K 13/00* (2006.01)
*A47K 13/26* (2006.01)

(52) U.S. Cl.
CPC ............ *A47K 13/005* (2013.01); *A47K 13/26* (2013.01)

(58) Field of Classification Search
CPC .................................................... A47K 13/005
See application file for complete search history.

(56) References Cited

U.S. PATENT DOCUMENTS

| | | | | |
|---|---|---|---|---|
| 4,909,353 A * | 3/1990 | Govin | ........................ | A45F 3/26 182/187 |
| 5,083,324 A * | 1/1992 | Strong | .................... | A47K 11/04 182/187 |
| 5,156,236 A * | 10/1992 | Gardner | ................ | A01M 31/02 182/135 |
| 5,265,780 A * | 11/1993 | Matthews | ................. | A45F 4/02 182/187 |
| 5,311,967 A * | 5/1994 | Kennedy | ................ | A63B 27/00 182/187 |
| 6,081,942 A | 7/2000 | Bellamy | | |
| 6,250,427 B1 * | 6/2001 | Williams, Jr. | ........ | A01M 31/02 182/187 |
| 6,546,569 B2 | 4/2003 | Figueras | | |
| 6,568,505 B1 * | 5/2003 | D'Acquisto | .......... | A01M 31/02 182/136 |
| 6,668,976 B2 * | 12/2003 | Graham, Jr. | ........... | A63B 27/00 182/136 |
| 9,161,665 B2 * | 10/2015 | Cahoon | .................. | A47K 11/02 |
| 10,827,887 B2 | 11/2020 | Gombar | | |

* cited by examiner

*Primary Examiner* — Christine J Skubinna
(74) *Attorney, Agent, or Firm* — Plager Schack LLP; Mark H. Plager; Kara K. Verryt

(57) ABSTRACT

A portable toilet device may include a seat; a frame having a back, right side, and left side, the frame supporting the seat; a right folding side frame member attached to the right side of the frame; a left folding side frame member attached to the left side of the frame; frame grip teeth extending outward from the back of the frame; a strapping member attached to each of the right folding side frame member and the left folding side frame member; and a locking mechanism configured to removably secure the right folding side frame member and the left folding side frame member in an unfolded configuration, wherein the strapping member is sized to encircle an upright support.

6 Claims, 3 Drawing Sheets

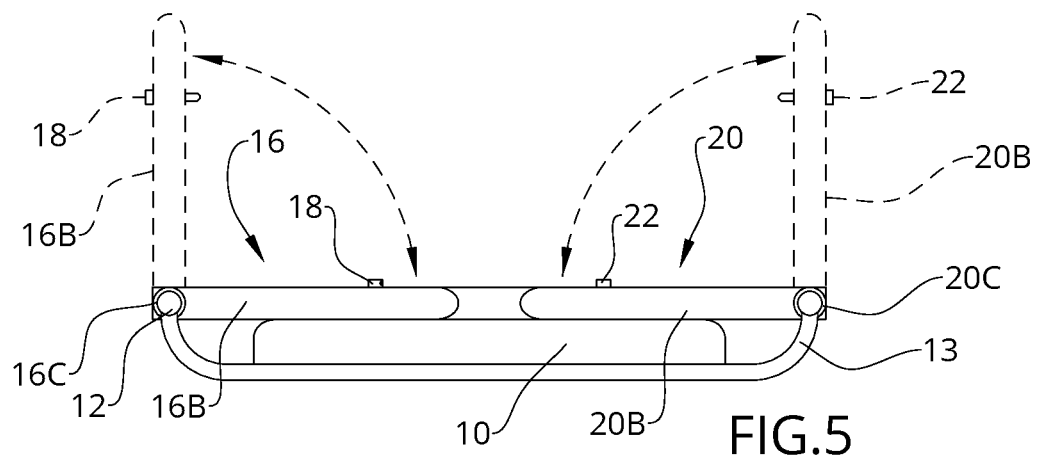
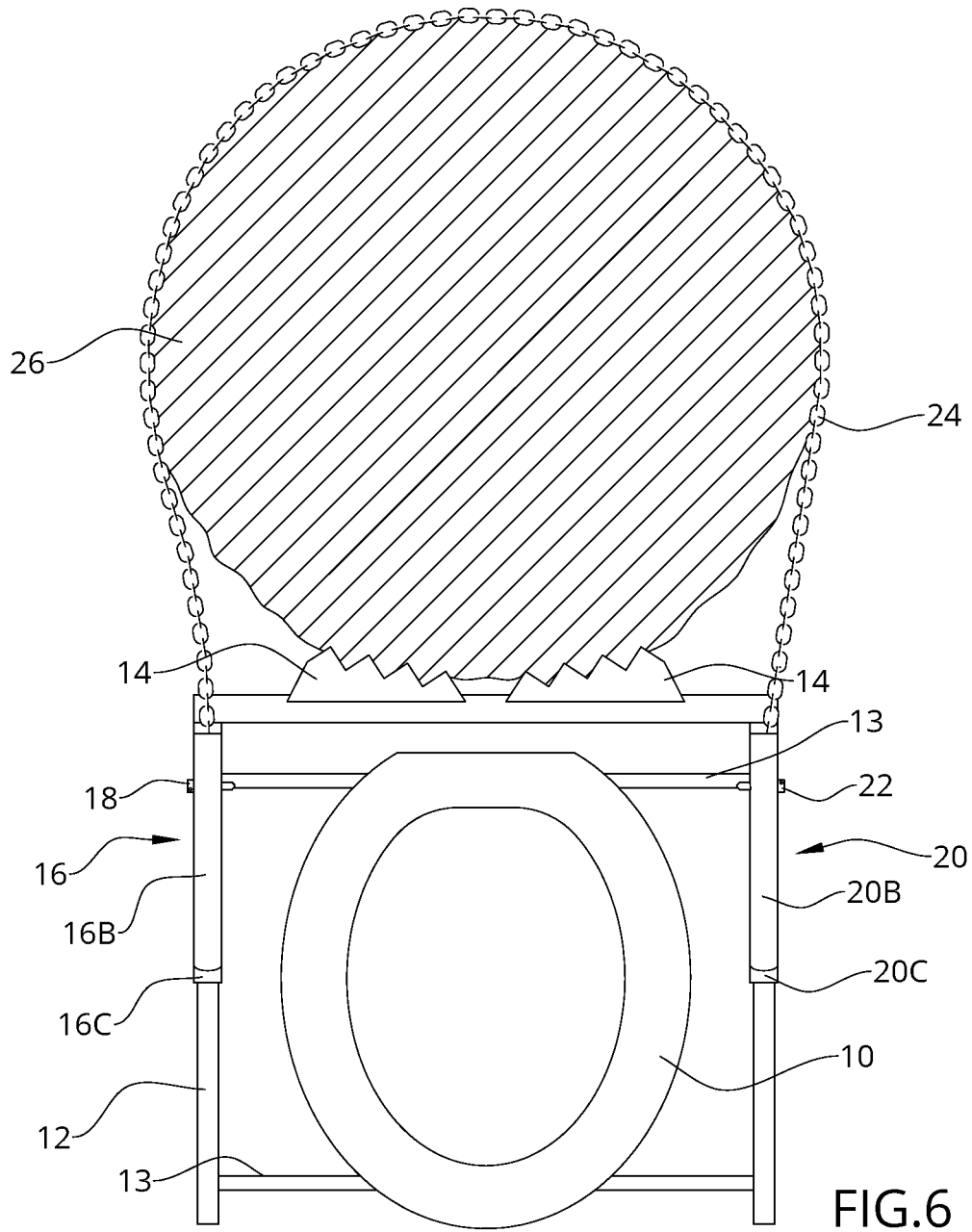

PORTABLE TOILET SEAT

BACKGROUND

The embodiments described herein relate generally to portable outdoors equipment and, more particularly, to a portable toilet seat that attaches to any tree or post with the use of a chain and leverage.

When in a rural setting away from bathroom, such as when camping or hiking, it can be difficult to defecate or urinate without an adequate place to do so. Existing portable toilets sit on the ground, include many parts and pieces, and tend to be quite bulky, making them not easily portable. Many existing portable toilets do not work well because they are too low to be used comfortably, cannot be stored easily, and are limited in where they can be used. For example, for the devices that sit on the ground, a user would need a flat or substantially flat surface to place the toilet, which is not always available when hiking or the like.

Therefore, what is needed is a portable toilet seat configured to support a user, wherein the portable toilet seat may be positioned at any desired height, is easily set up using any tree or post, and folds into a compact configuration for transportation and storage.

SUMMARY

Some embodiments of the present disclosure include a portable toilet device. The portable toilet device may include a seat; a frame having a back, right side, and left side, the frame supporting the seat; a right folding side frame member attached to the right side of the frame; a left folding side frame member attached to the left side of the frame; frame grip teeth extending outward from the back of the frame; a strapping member attached to each of the right folding side frame member and the left folding side frame member; and a locking mechanism configured to removably secure the right folding side frame member and the left folding side frame member in an unfolded configuration, wherein the strapping member is sized to encircle an upright support.

BRIEF DESCRIPTION OF THE FIGURES

The detailed description of some embodiment wherein invention is made below with reference to the accompanying figures, wherein like numerals represent corresponding parts of the figures.

FIG. 5 is a side view of one embodiment of the present disclosure, shown folding.

FIG. 6 is a section view of one embodiment of the present disclosure, taken along line 6-6 in FIG. 1.

DETAILED DESCRIPTION

Figure 1:
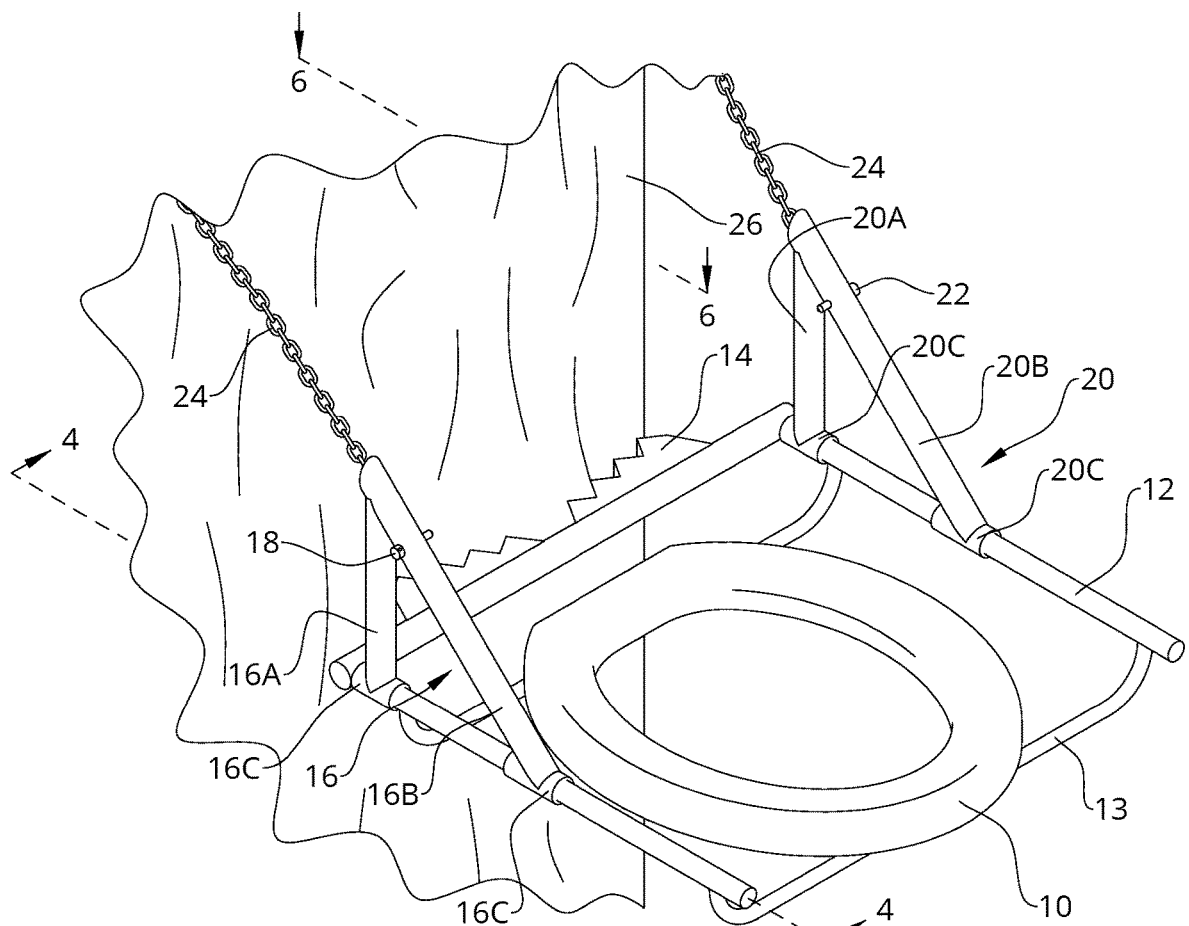
FIG. 1 is a perspective view of one embodiment of the present disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a portable toilet seat and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-6, some embodiments of the present disclosure include a portable toilet device comprising a seat 10; a frame having a back, right side, and left side, the frame supporting the seat 10; folding side frame members attached to each of the right side and the left side of the frame; frame grip teeth 14 extending outward from an external surface of the back of the frame; a strapping member attached to a top point of each of the folding side frame member, wherein the strapping member is sized to encircle an upright support, such as a tree 26, a post, or the like; and a locking mechanism configured to removably secure the folding side frame members in an unfolded configuration. As shown in the Figures, the seat 10 may comprise a toilet seat.

More specifically, and as shown in the Figures, the frame 12 may comprise a back support having a right end and a left end, a right support extending substantially perpendicularly outward from the right end, and a left support extending substantially perpendicularly outward from the left end, wherein the right support is substantially parallel to the left support. As such, the frame 12 may have a squared off U-shape. The length of the back support and, thus, the distance between the right support and the left support may be sufficient to accommodate a seat 10 therein. Thus, the distance between the right support and the left support may be greater than a width of a toilet seat.

As shown in the Figures, at least two cross members 13 may extend between the left support and the right support. In some embodiments, and a shown in the Figures, each of the cross members 13 may comprise a rod like support wherein each end of the rod comprises curved ends, such that the cross member 13 extends downward from a bottom surface of the frame 12 and is not planar with the frame 12. As shown in the Figures, a first cross member 13 may be positioned proximate to the back of the frame 12 and a second cross member 13 may be positioned proximate to distal ends of each of the left support and the right support. The first cross member 13 and the second cross member 13 may be spaced a sufficient distance apart from one another to support the seat 10 without impeding use of the seat 10. In other words, the cross member 13 may not block the opening in seat 10.

Figure 2:
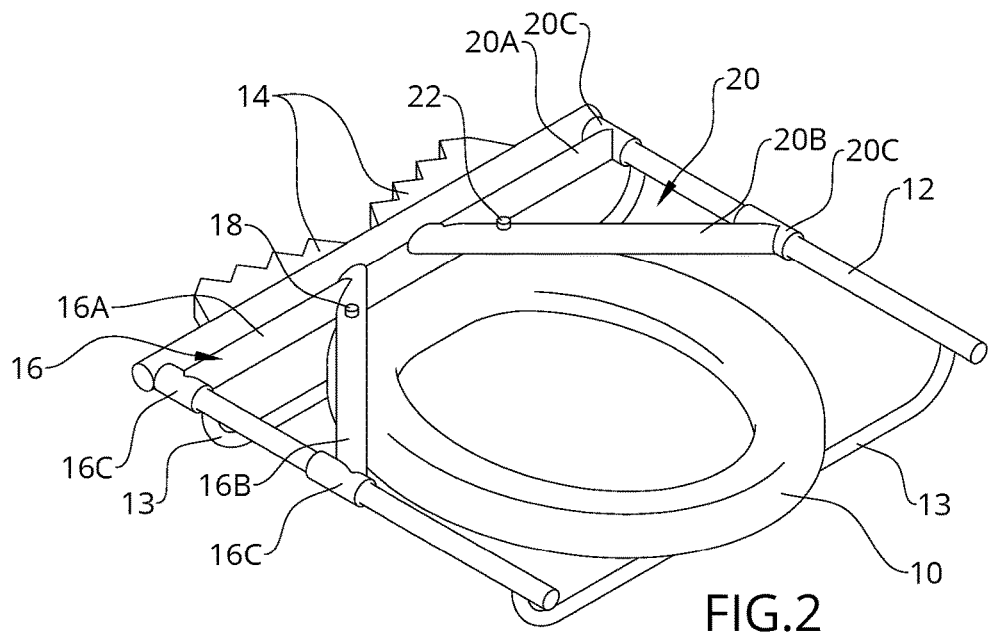
FIG. 2 is a perspective view of one embodiment of the present disclosure, shown folded.
Figure 3:
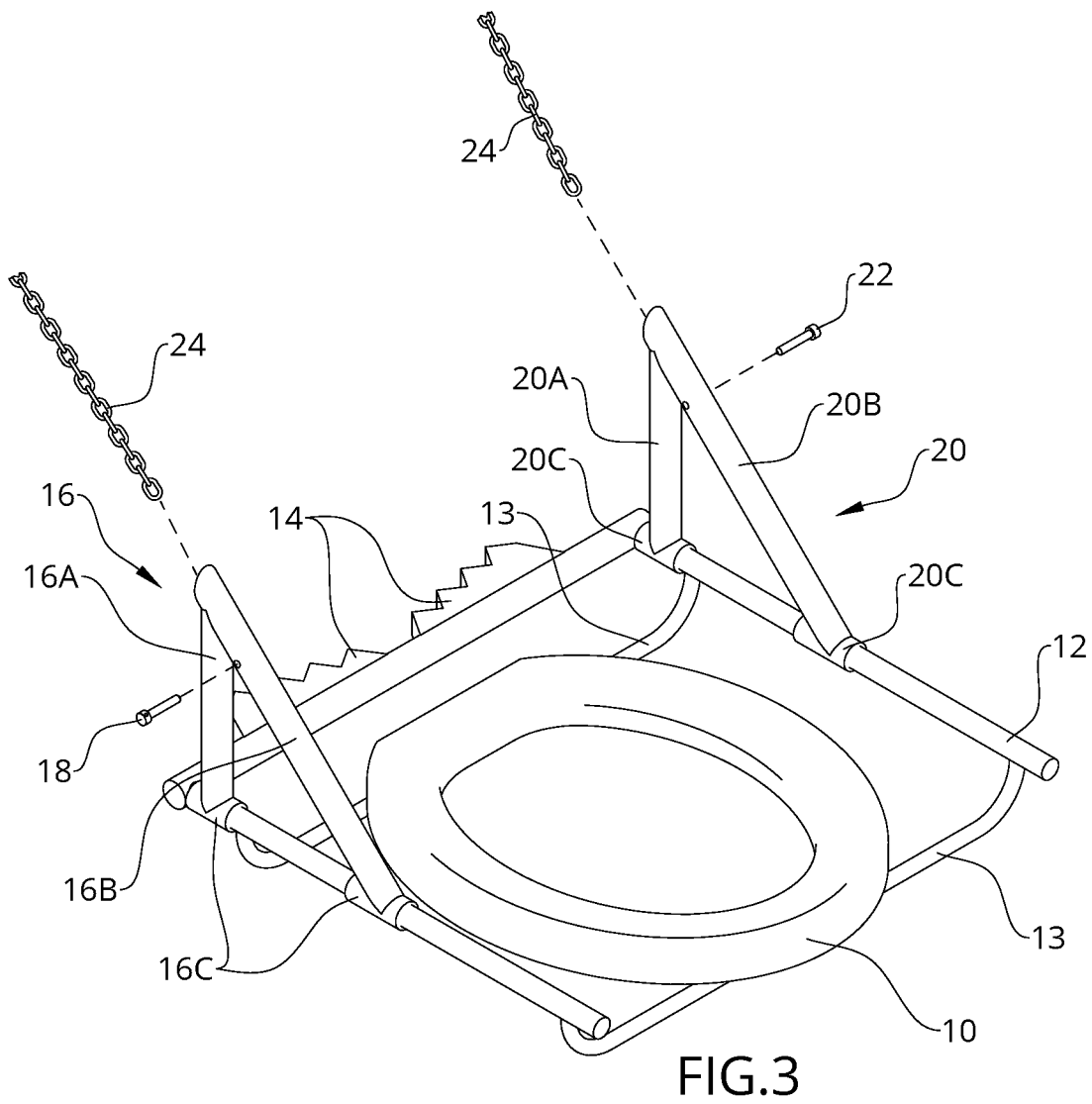
FIG. 3 is an exploded view of one embodiment of the present disclosure.

As described above, a right folding frame member 20 and a left folding frame member 16 may be hingeably or pivotably attached to the frame 12 such that each frame member is configured to move between a folded configuration, as shown in FIG. 2, and an unfolded configuration, as shown in FIG. 3. In a particular embodiment, the right folding frame member 20 may be hingeably or pivotably attached to the right support, and the left folding frame member 16 may be hingeably or pivotably attached to the left support. In some embodiments, the left folding frame member 16 may comprise a left upright support 16A configured to extend substantially perpendicularly from the left support, a left slanted support 16B extending at an angle from a top end of the left upright support 16A to the left support, a first left foot member 16C extending from a bottom end of the left upright support 16A, and a second left foot member 16C extending from a bottom end of the left slanted support 16, wherein each of the foot members 16C is pivotally mounted to the left support. For example, as shown in the Figures, the left support may comprise a rod or tubular member, and each of the foot members 16C may comprise a cylindrical collar configured to slidably encircle the left support.

The right folding frame member 20 may have a structure that is substantially identical to the left folding frame member 16. Thus, the right folding frame member 20 may comprise a right upright support 20A, a right slanted support 20B extending from a top end of the right upright support 20A to the right support, a first right foot member 20C extending from a bottom of the right upright support 20A, and a second right foot member 20C extending from a bottom of the right slanted support 20B, wherein each of the right foot members 20C is configured to slidably encircle the right support.

In some embodiments, due to the structure of the left folding frame member 16 and the right folding frame member 20, they may each define a triangular sidewall.

As mentioned above frame grip teeth 14 may extend outward from the back of the frame 12. More specifically, and as shown in FIG. 6, the grip teeth 14 may comprise toothed protrusions extending outward from the back of the frame 12, wherein the grip teeth 14 may form a substantially concave or angled surface configured to be aligned with and positioned against the outer surface of a tree 26, post, or the like. The teeth 14 may be oriented to be facing away from the back of the frame 12 such that they are configured to grip against the tree 26, post, or the like.

As described previously, the device may also comprise a strapping member removably attached to a top portion of each of the left folding frame 16 and the right folding frame 20. More specifically, the strapping member may have a first end configured to removably engage with the left folding frame member 16 and a second end configured to removably engage with the right folding frame member 20, wherein a central portion of the strapping member (i.e., the portion of the strapping member between the first end and the second end) may be configured to encircle or wrap around a tree 26, post, or the like. In embodiments, the length of the strapping member may be adjustable.

Figure 4:
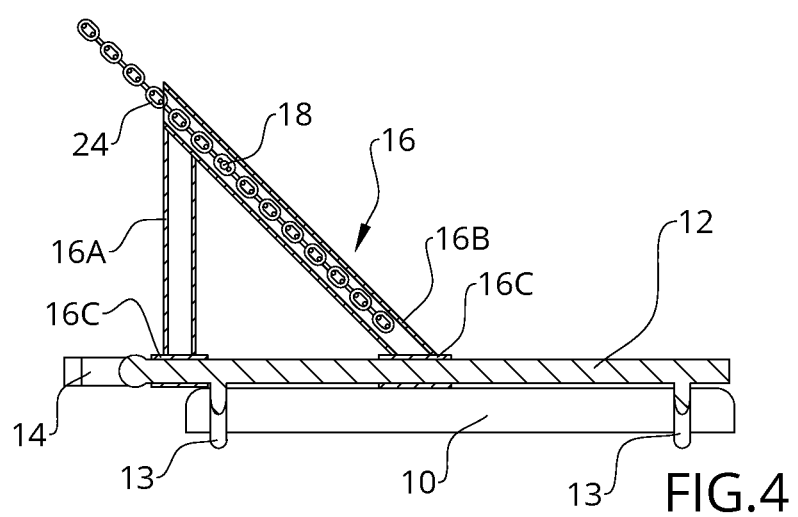
FIG. 4 is a section view of one embodiment of the present disclosure, taken along line 4-4 in FIG. 1.

In a particular embodiment, and as shown in the Figures, the strapping member may comprise a chain 24. As shown in FIG. 4, each of the left angled support 16B and the right angled support 20B may comprise a substantially hollow tube, wherein the tube is sized to accommodate insertion of the chain 24 therein. A locking mechanism, such as a pin 18, 22, may be inserted through the slanted support, thus engaging with and securing the chain 24 in place with respect to the slanted support. When the pin 18, 22 is engaged with the respective slanted support and the respective end of the chain 24, the folding frame member may be locked in an open or unfolded configuration.

The components of the device of the present disclosure may be made of any suitable materials and, in some embodiments, may comprise lightweight, yet sturdy materials such that the device is easily transportable while still sufficiently supporting a user. The frame 12 and cross members 13 may be made from rods, tubes, or the like. For example, the frame 12 and cross members 13 may comprise tubular steel pieces that are welded together at joints. The folding frame members may also comprise rods or tubular members, wherein at least the slanted support may comprise a hollow tube member. The seat 10 may comprise a substantially conventional toilet seat, which may be simply placed or physically attached to the cross members 13. Any known and sufficient attachment means, such as the use of adhesive or conventional fasteners, is envisioned.

To use the device of the present disclosure, a user may first remove the device from a storage location and deploy the device from a folded/stowed/flat configuration, as shown in FIG. 2, into an unfolded configuration, as shown in FIG. 3. The user may then choose a suitable location and tree 26, post, or the like, and hold the device flat at the desired height against the tree, post, or the like, with the grip teeth 14 positioned firmly against the tree 26, post, or the like. The user may then position the chain 24 around the tree 26, post, or the like, and insert both ends of the chain 24 into the respecting slanted support members. The pins 18, 22 may then be inserted into the slanted support members and through the chain 24 to secure the chain 24. The user may then proceed with sitting on the seat 10, causing it to become secured by the addition of weight combined with leverage. The user may then use it as a toilet, as needed. In some embodiments a bag or other catching device, such as a bucket, may be attached to or positioned beneath a bottom of the frame. When finished, the user may stand up, remove the pins from the slanted supports and fold the folding frame members, as shown in FIG. 5 for storage and transport.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A portable toilet device comprising:
   a seat;
   a frame having a back, right side, and left side, the frame supporting the seat;
   a right folding side frame member attached to the right side of the frame;
   a left folding side frame member attached to the left side of the frame;
   frame grip teeth extending outward from the back of the frame;
   a strapping member attached to each of the right folding side frame member and the left folding side frame member; and
   a locking mechanism configured to removably secure the right folding side frame member and the left folding side frame member in an unfolded configuration,
   wherein:
   the strapping member is sized to encircle an upright support;
   the seat is a toilet seat;
   the left folding side frame member comprises:
      a left upright support configured to extend substantially perpendicularly from the left support;

a left slanted support extending at an angle from a top end of the left upright support to the left support;

a first left foot member extending from a bottom end of the left upright support; and a second left foot member extending from a bottom end of the left slanted support, wherein each of the foot members is pivotably mounted to the left support;

the right folding side frame member comprises:

a right upright support configured to extend substantially perpendicularly from the right support;

a right slanted support extending at an angle from a top end of the right upright support to the right support;

a first right foot member extending from a bottom end of the right upright support; and a second right foot member extending from a bottom end of the right slanted support, wherein each of the foot members is pivotably mounted to the right support;

the left support comprises a tubular member;

the right support comprises a tubular member; and each of the first right foot, the second right foot, the first left foot, and the second left foot comprise a substantially cylindrical collar configured to encircle the respective support selected from the group consisting of the left support and the right support.

2. The portable toilet device of claim 1, wherein the frame comprises:

a back support having a right end and a left end;

a right support extending substantially perpendicularly outward from the right end; and a left support extending substantially perpendicularly outward from the left end, wherein the right support is substantially parallel to the left support.

3. The portable toilet device of claim 2, further comprising at least two cross members extending between the left support and the right support, wherein the seat is supported by the at least two cross members.

4. The portable toilet device of claim 1, wherein each of the left slanted support and the right slanted support comprise a hollow tube member configured to accommodate insertion of an end of the strapping member therein.

5. The portable toilet device of claim 4, further comprising a right pin and a left pin, wherein:

the right pin is removably engaged with the right slanted support and a first end of the strapping member; and the left pin is removably engaged with the left slanted support and a second end of the strapping member.

6. The portable toilet device of claim 5, wherein the strapping member is a chain.

\* \* \* \* \*